INVENTORS:
Fritz Reifenhäuser
Herbert Rahlfs 3,726,743
FILM BLOWING METHOD AND APPARATUS
Fritz Reifenhauser, Troisdorf, and Herbert Rahlfs, Lohmar, Germany, assignors to Reifenhauser KG, Troisdorf, Germany
Filed Nov. 2, 1970, Ser. No. 86,214
Claims priority, application Germany, Oct. 31, 1969,
P 19 54 824.4
Int. Cl. B30b *11/22;* B32b *31/30*
U.S. Cl. 156—494
5 Claims

ABSTRACT OF THE DISCLOSURE

An apparatus for the blowing of thermoplastic film wherein a pair of closed envelopes of thermoplastic material are extruded from concentric and coaxial dies and are independently blown and orientated prior to being passed together between a pair of calendering and compression rolls. A parting compound to enable separation of the laminated foils emerging from the rolls or an adhesion means may be applied to the interface of the two blown bodies.

(1) Field of the invention

Our present invention relates to film blowing and, more particularly, to the simultaneous blowing of two films to form a laminated foil.

(2) Background of the invention

Film blowing is a process of forming thermoplastic film wherein an extruded plastic tube is continuously inflated by internal air pressure, cooled, collapsed by rolls and wound up on subsequent rolls. The tube or parison is usually extruded vertically upwardly and air is admitted as the hot tube emerges from the die. Air is retained within the blown bubble or balloon by means of the pinch rolls which collapse the film. The thickness of the film is, of course, controlled by varying the internal air pressure and hence the degree of blowing and by varying the rate of extrusion.

It has been recognized that the pinch rolls may be driven at a rate in excess of the linear velocity with which the tube emerges from the die for uniaxial orientation in the direction of extrusion as a result of the stretching film. Furthermore, since blowing produces expansion laterally of the direction of advance of the tube, some degree of orientation occurs in this direction as well and, when both effects are provided, biaxial orientation results.

The term "orientation" is used herein to describe the process of stretching a hot plastic article to revise the molecular configuration or alignment, thus improving mechanical properties. When the stretching force is applied in one direction, uniaxial orientation results. When the stretching is in two directions, the result is biaxial orientation.

In the art of film blowing, it has been proposed to extrude two tubes coaxially from planar annular orifices of an extrusion die and to blow the tubes together to expand them outwardly prior to the passage of the laminated balloon thus formed into the nip of the pinch rolls. Such arrangements are provided for the production of laminated foils, especially where the pinch rolls are intended to bond the laminated layers together.

In a laminated-tube film blowing arrangement of the character described, the inner tube lies along the inner wall of the outer tube while the outer tube lies along the outer wall of the inner tube and, consequently, both tubes are blown essentially identically and form a single balloon prior to passage into the nip of the pinch rolls. They are subjected to essentially identical longitudinal stretch (i.e., stretch in the direction of extrusion) and essentially identical transverse stretch (i.e., stretch along the circumference of the tube, hereinafter referred to as lateral or circumferential stretch). Furthermore, the layers of the thermoplastic must cool at identical rates and have properties which, therefore, are mutually dependent. As a practical matter, therefore, the lamination of foils in this manner has been restricted to the production of esthetic effects by using foils of different coloration or optical properties. Of course, where one of the foils has mechanical properties different from those of the other foil, the composite has properties which are a combination of the properties of both. It is not, however, possible to impart a tensile strength to one of the foils in one direction which differs from the tensile strength in the same direction of the other foil by stretching and, for the most part, the production of laminated films by blowing in this fashion has been avoided.

(3) Objects of the invention

It is the principal object of the present invention to provide a system for blowing film wherein the aforementioned disadvantages can be obviated.

Another object of this invention is to provide an apparatus for producing laminated film with layers of different mechanical properties.

It is also an object of the present invention to provide an apparatus for the blowing of film laminates wherein the layers of the film have different mechanical properties although they may have identical compositions.

It is still another object of the invention to provide an improved apparatus blowing film laminates with better physical properties than has been possible of attainment heretofore.

(4) Summary of the invention

These and other objects which will become apparent hereinafter are attained, in accordance with the present invention, in a system blowing thermoplastic film wherein an inner tube and an outer tube are extruded coaxially from axially-spaced orifices and are passed collectively through the nip of a pair of pinch rolls while the tubes are blown from respective air sources individually. According to the principles of the present invention, two tubes are blown simultaneously but with respective blowing means completely independently from one another and thereby can be stretched or tensioned in different directions to different extents, the tubes then being combined into a flattened band as they pass through the pinch rolls.

In accordance with one aspect of the invention, the layers of the laminated film can be separated subsequent to pinching and, possibly, after unrolling of the storage or takeup rolls or prior to winding on the latter. To this end, a parting compound, e.g., an oil or fine powder, may be deposited at the interface to prevent bonding of the inner surface of the outer tube to the outer surface of the inner tube as the tubes are drawn through the pinch rolls. Of course, we may prefer to bond the tubes together and form a unitary laminate, in which case we may use the heat and pressure present in the nip between the pinch rolls or may apply to the interface between the tubes an adhesive or other bonding means, e.g., an electrostatic charge.

When the two tubes are to be composed of different materials, we connect two extruders to the nozzle assembly, each communicating with a respective orifice of the die. However, we prefer to make use of a single-extruder arrangement which can communicate with both orifices so that the same thermoplastic materials constitute each tube. In this case, we impart distinct physical properties to the respective tubes by varying the stretch thereof. For example, we may blow the internal tube which is extruded from a relatively small-diameter orifice, into a large-diameter balloon or parison such that the ratio of the diameter of the blown tube to the orifice diameter is proportionately large. The outer tube may be blown essentially to the same diameter as the inner tube but derives from a large diameter orifice, according to the instant invention, so that the ratio of the blown diameter to the extruded diameter is smaller. These ratios, of course, are linearly related to the degree of stretch and hence the inner tube may be said to be transversely or circumferentially orientated. If the velocity at which the outer tube is extruded, is less than the velocity of extrusion of the inner tube, the rate at which the outer tube is accelerated as it feeds to the nip of the pinch rolls will exceed any acceleration of the inner tube and hence apply a longitudinal stretch to the outer tube which exceeds the longitudinal stretch applied to the inner tube. The outer tube may thus be longitudinally orientated. When the two layers are laminated together upon passage between the pinch rolls, the laminate has so-called biaxial orientation. We may also wish to alter the physical properties of one of the thermoplastic layers relative to another by varying the cooling rates of the two layers. In this case one of the tubes is cooled independently of the other.

According to another aspect of this invention, the two tubes are extruded through a die or nozzle or head connectable with one or more extruders and provided with at least two coaxial annular extrusion orifices axially spaced apart, each of these orifices being associated with respective blowing passages located therewithin. Downstream of, i.e. above, the head is a pair of pinch rolls between which the extruded and blown film is passed. These takeup rolls, therefore, are common to both tubes. We have found that best results are obtained when the ratio of the diameter of the blown tubes to the diameter of the inner orifice is greater than the ratio of the diameter of the blown tubes to the diameter of the outer orifice. The feed rates of the extruded tube and of the blowing air are independently regulated.

The system of the present invention has the significant advantage that the physical characteristics of the individual layers of a laminated foil can be modified individual layers of a laminated foil can be modified individually by stretching, controlled cooling, selection of materials, etc. to achieve optimum values independently of the other layer. Biaxially orientated films can thus be produced as noted earlier.

(5) Description of the drawing

The above and other objects, features and advantages of the present invention will become more readily apparent from the following description, reference being made to the accompanying drawing in which.

(6) Specific description

Figure 1:
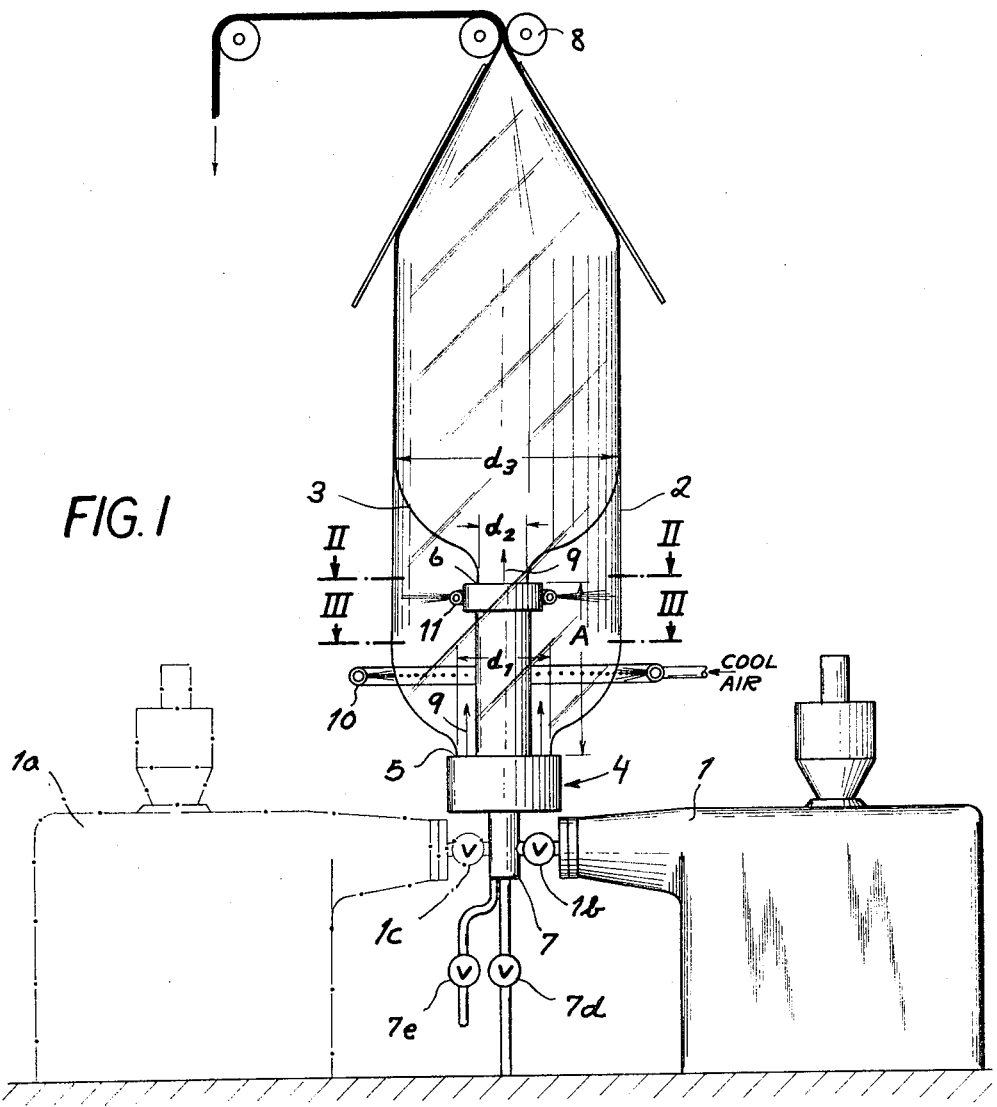
FIG. 1 is a vertical elevational view, partly in section, diagrammatically illustrating an apparatus for carrying out the method of the present invention.

The system illustrated in FIG. 1 comprises an extruder 1 for thermoplastic which communicates with a plural-orifice head 4 for extruding two synthetic resin layers 2 and 3 which may be the same material and may be extruded at different rates. If the two layers are extruded in tubes of identical thickness with a common pressure behind the extruder, the tube 2 will issue from the orifice associated therewith at a lower velocity and will be longitudinally stretched by the pinch rolls 8 to a greater extent. On the other hand, the tube, emerging from the small diameter orifice at 3, issues at a higher velocity and is longitudinally stretched to a lesser extent.

When different materials are to constitute the layers 2 and 3, we may make use of a second extruder 1a shown in dot-dash lines in FIG. 1 to supply the other thermoplastic materials.

Figure 3:
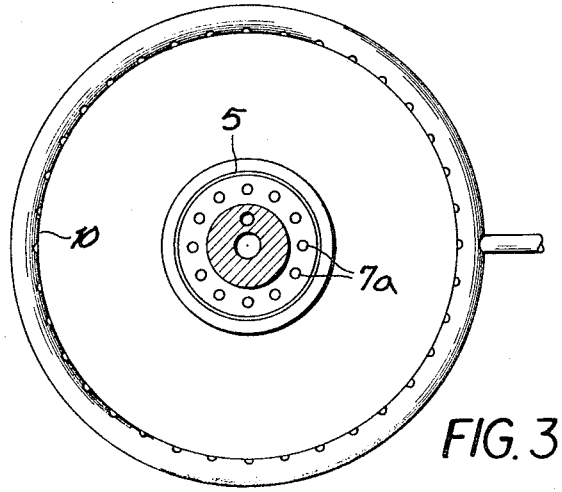
FIG. 3 is a view taken along the line III—III of FIG. 1.
Figure 2:
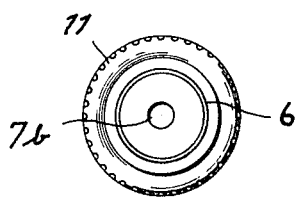
FIG. 2 is a view taken along the line II—II of FIG. 1.

The head 4 comprises a pair of concentric orifices 5 and 6 best seen in FIGS. 2 and 3 from which the tubes 2 and 3 emerge. Within the lower portion of the head 4, surrounded by the orifice 5, there are provided passages 7a from which the blowing gas for the outer tube enters the parison. A central passage 7b is provided for delivering air to the inner tube 3 within the orifice 6. The respective air pressures are controlled by valves 7c and 7d feeding the blowing head 7.

An important feature of the present invention is that the inner orifice 6 is located at an axial distance A from the outer orifice, this distance preferably being equal approximately to $0.25d_3$ to $3d_3$ where $d_3$ is the diameter into which the tubes are blown. The diameter $d_2$ of the inner orifice 6 is smaller than the diameter $d_1$ of the outer orifice 5. The rate of flow of the thermoplastic from the respective orifices may be controlled as represented diagrammatically by the valves 1b and 1c. The ratio $$\frac{d_3}{d_2} > \frac{d_3}{d_1}$$

and preferably the ratio $d_2/d_1$ is approximately 1:2.

In operation, the tubes are extruded in the usual manner and at the different rates indicated earlier. Cooling air may be supplied from cooling rings as represented at 10 in the usual manner to cool the layers at different rates. The tubes 2 and 3, however, are independently expanded by blowing although they form a balloon of diameter $d_3$ as noted. The degree to which the inner layer 3 has stretched, of course, is in excess of the lateral stretch of the tube 2. Hence the tube 2 is longitudinally orientated while tube 3 is preferentially orientated in the transverse or circumferential direction. To rovide adhesion between the two layers, we may spray an adhesive substance onto the interface as shown at 11, induce a chemical reaction at the interface or electrostatically charge one or both surfaces by a ring such as that provided at 11 to develop a corona discharge. When it is desired to enable separation of the layers, member 11 sprays a parting medium onto the interface as noted earlier.

What is claimed is:

1. An apparatus for producing laminated foils comprising:
    extrusion means including at least one extruder for a thermoplastic material;
    an extrusion head provided with a pair of axially offset extrusion orifices coaxial with one another for extruding an inner tube and an outer tube of thermoplastic material while communicating with said extrusion means;
    ulowing means associated with each of said orifices completely independent of one another for individually biaxially orienting said tubes;
    means for pinching said tubes collectively and drawing said tubes away from said head; and
    means for controlling the gas pressures within said tubes individually.

2. The apparatus defined in claim 1 wherein said tubes are blown to a diameter $d_3$, the orifice of said inner tube having a diameter $d_2$ and the orifice of said outer tube having a diameter $d_1$ wherein $$\frac{d_3}{d_2} > \frac{d_3}{d_1}$$

3. The apparatus defined in claim 2 wherein $d_2:d_1$ is approximately 1:2.

4. An apparatus for producing laminated foils comprising:

extrusion means including at least one extruder for a thermoplastic material;

an extrusion head provided with a pair of axially off-set extrusion orifices coaxial with one another for extruding an inner tube and an outer tube of thermoplastic material while communicating with said extrusion means;

blowing means associated with each of said orifices completely independent of one another for individually biaxially orienting said tubes;

means for pinching said tubes collectively and drawing said tubes away from said head, said tubes being blown to a diameter $d_3$, the orifice of said inner tube having a diameter $d_2$ and the orifice of said outer tube having a diameter $d_1$ wherein $$\frac{d_3}{d_2} > \frac{d_3}{d_1}$$

$d_2:d_1$ being approximately 1:2; and means for controlling the gas pressures within said tubes individually.

5. The apparatus defined in claim 4, further comprising means for controlling the rates of flow of thermoplastic material through said orifices.

References Cited
UNITED STATES PATENTS

| | | | |
|---|---|---|---|
| 3,486,196 | 12/1969 | Klenk et al. | 156—501 |
| 3,568,252 | 3/1971 | Masuda et al. | 264—95 |
| 3,576,658 | 4/1971 | Notomi et al. | 264—95 |
| 3,411,981 | 11/1968 | Thomas | 156—244 |
| 3,467,565 | 9/1969 | Utz | 156—244 |
| 3,619,445 | 11/1971 | Carlson | 264—95 |
| 3,576,929 | 4/1971 | Turner et al. | 264—95 |

ROBERT F. BURNETT, Primary Examiner

G. W. MOXON II, Assistant Examiner

U.S. Cl. X.R.

156—229, 244, 285, 497, 500; 264—95; 425—326